(12) United States Patent
Shanklin et al.

(10) Patent No.: US 6,672,520 B2
(45) Date of Patent: *Jan. 6, 2004

(54) SINGLE VALVE READY TO USE HOSE END SPRAYER

(75) Inventors: Donald Shanklin, Fullerton, CA (US); Ronald F. Englhard, Viejo, CA (US)

(73) Assignee: Hayes Product, LLC., Buena Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/282,272

(22) Filed: Oct. 28, 2002

(65) Prior Publication Data

US 2003/0052193 A1 Mar. 20, 2003

Related U.S. Application Data

(63) Continuation of application No. 09/542,956, filed on Apr. 3, 2000, now Pat. No. 6,578,776.

(51) Int. Cl.[7] .................................................. B05B 7/30
(52) U.S. Cl. ........................ 239/318; 239/414; 239/353; 239/354
(58) Field of Search ................................ 239/302, 310, 239/316, 318, 407, 413, 414, 418, 426, 433, 434, 537, 538, 579, 581.1, 340, 344, 353, 354; 222/630, 637

(56) References Cited

U.S. PATENT DOCUMENTS

| | | |
|---|---|---|
| 2,571,871 A | 10/1951 | Hayes |
| 3,186,643 A | 6/1965 | George et al. |
| 4,281,796 A | 8/1981 | Fugent et al. |
| 4,349,157 A | 9/1982 | Beiswenger et al. |
| 4,508,272 A | 4/1985 | Thompson |
| 4,595,127 A | 6/1986 | Stoody |
| 5,039,016 A | 8/1991 | Gunzel, Jr. et al. |
| 5,100,059 A | 3/1992 | Englhard et al. |
| 5,213,264 A | 5/1993 | Styne |
| 5,213,265 A | 5/1993 | Englhard et al. |
| 5,356,076 A | 10/1994 | Bishop |
| 5,372,310 A | 12/1994 | Ketcham |
| 5,383,603 A | 1/1995 | Englhard et al. |
| D358,865 S | 5/1995 | Englhard et al. |
| 5,954,272 A | 9/1999 | Liao |
| 6,378,785 B1 | 4/2002 | Dodd |

OTHER PUBLICATIONS

Notice of Reexamination Request filing date: Notice of Assignment of Reexamination Request and Reexamination Request for US patent No. 6,378,785 filed on Sep. 5, 2002.

*Primary Examiner*—Christopher Kim
(74) *Attorney, Agent, or Firm*—Knobbe, Martens, Olson & Bear, LLP.

(57) ABSTRACT

The present invention relates to a chemical sprayer that includes a sprayer head assembly and a container. The container defines a cavity for storing a chemical to be sprayed. The sprayer head assembly includes a chemical passage, a carrier fluid passage, a vent passage, a valve chamber and a valve. The chemical passage is communication with the cavity. The carrier fluid passage is in communication with a carrier fluid source. Both the carrier fluid and chemical passages are in communication with the valve chamber. The valve is moveably positioned within the valve chamber and defines at least partially a first passage and a second passage. The first passage is configured so as to be in communication with the chemical passage when the valve is in an open position. The second passage is configured so as to be in communication with the carrier fluid passage when the valve is in the open position. The first and second passages are also configured so as to not be in communication with the chemical and carrier fluid passages when said valve is in a closed position. The valve also includes one or more seal portions positioned on the valve so as to block both the chemical and the carrier fluid passages when said valve is in the closed position. The sealing portions also preferably blocks a vent passage when the valve in the closed position. The second passage also preferably forms at least in part an outlet of the sprayer head assembly. A suction generating surface is also preferably defined by the valve.

18 Claims, 12 Drawing Sheets

SINGLE VALVE READY TO USE HOSE END SPRAYER

This application is a continuation of U.S. patent application Ser. No. 09/542,956, filed Apr. 3, 2000, which issued as U.S. Pat. No. 6,578,776.

BACKGROUND OF THE INVENTION

1. Field of the Invention

The present invention relates to chemical dispensing sprayers and, in particular, to aspiration-type sprayers that use a relatively large amount of carrier fluid for dispensing a relatively small amount of a chemical solution.

2. Description of the Related Art

Every year consumers apply thousands of gallons of chemicals such as fertilizers or pesticides to plants, lawns, flowers, vegetable gardens and other organic type vegetation. Typically, such chemicals are sold in plastic containers in a concentrated form. While in this concentrated form, the chemical is extremely hazardous to the consumer end user and the environment in general. Accordingly, the container typically includes an aspiration-type sprayer head assembly. An aspiration-type sprayer uses a relatively large amount of carrier fluid, such as water, to withdraw, dilute and dispense a relatively small amount of chemical from the container. To further prevent harm to the consumer, the container and the sprayer head assembly are preferably disposed of after the container's contents are exhausted. It is therefore desirable to provide a sprayer head assembly that is sufficiently low cost so as to allow the entire unit to be discarded and yet reliable and safe.

SUMMARY OF THE INVENTION

It is therefore an object of the invention to provide a safe and reliable aspiration type chemical sprayer that utilizes a minimum number of components and that is relatively easy to manufacture and assemble.

Accordingly, one aspect of the present invention involves a chemical sprayer that comprises a sprayer head assembly and a container. The container defines a cavity for storing a chemical to be sprayed. The sprayer head assembly includes a chemical passage, a carrier fluid passage, a valve chamber and a valve. The chemical passage is in communication with the cavity. The carrier fluid passage is in communication with a carrier fluid source. Both the carrier fluid and chemical passages are in communication with the valve chamber. The valve is moveably positioned within the valve chamber and defines at least partially a first passage and a second passage. The first passage is configured so as to be in communication with the chemical passage when the valve is in an open position. The second passage is configured so as to be in communication with the carrier fluid passage when the valve is in the open position. The first and second passages are also configured so as to not be in communication with the chemical and carrier fluid passages when said valve is in a closed position. The valve also includes one or more seal portions positioned on the valve so as to block both the chemical and the carrier fluid passages when said valve is in the closed position.

Another aspect of the of the present invention involves a chemical sprayer comprising a sprayer head assembly and a container. The container defines a cavity for storing a chemical to be sprayed. The sprayer head assembly includes a chemical passage that is in communication with the cavity. The assembly also includes a carrier fluid passage that is in communication with a carrier fluid source. The assembly further includes a valve and a valve chamber. The valve chamber is in communication with the chemical and carrier fluid passages. The valve is moveably positioned within the valve chamber. The valve defines at least in part a first passage that is in communication with the chemical passage when the valve is in an open position. The valve also defines at least in part a second passage that is in communication with the carrier fluid passage when the valve is in the open position. The valve also includes a suction generating surface. The first passage has a mouth at the suction generating surface. The suction generating surface is positioned and configured such that the flow of carrier fluid over the suction generating surface creates a suction that draws chemical through the chemical passage to the mouth.

Yet, another aspect of the present invention involves a chemical sprayer comprising a sprayer head assembly and a container. The container defines a cavity for storing a chemical to be sprayed. The sprayer head assembly includes a chemical passage, a carrier fluid passage, a valve chamber, a valve, and an outlet. The chemical passage is in communication with the cavity. The carrier fluid passage is in communication with a carrier fluid source. The valve chamber is in communication with the chemical and carrier fluid passages. The valve is moveably positioned within the valve chamber. The valve defines at least in part a first passage that communicates with the chemical passage when the valve is in an open position. The chemical passage terminates at a suction generating surface that is defined by the valve. The suction generating surface is positioned and configured such that the flow of carrier fluid over the suction generating surface creates a suction that draws chemical through the chemical passage to the suction generating surface. The outlet for the carrier fluid and the chemical is formed at least in part by the valve.

Yet another embodiment of the present invention involves a chemical sprayer comprising a sprayer head assembly and a container. The container defines a cavity for storing a chemical to be sprayed. The sprayer head assembly comprises a chemical passage that is in communication with the cavity and a carrier fluid passage that is in communication with a carrier fluid source. A valve chamber is in communication with the chemical passage. A valve is moveably positioned within the valve chamber. The valve defines at least in part a first passage that communicates with the chemical passage when the valve is in an open position. The valve also defines a metering orifice that is in communication with the first passage.

Another embodiment of the present invention involves a chemical sprayer comprising a sprayer head assembly and a container. The container defines a cavity for storing a chemical to be sprayed. The sprayer head assembly comprises a chemical passage that is in communication with the cavity. A carrier fluid passage is in communication with a carrier fluid source. A valve chamber is in communication with the chemical passage. A valve is moveably positioned within the valve chamber. The valve defining at least in part a first passage that is in communication with the chemical passage when the valve is in an open position. The valve further includes one or more sealing portions that form an annular seal around the chemical passage when the valve is in the open position.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

These and other features of the invention will now be described with reference to the drawings of the preferred embodiments, which are intended to illustrate and not to limit the invention, and in which.

DETAILED DESCRIPTION OF THE PREFERRED EMBODIMENT

Figure 1:
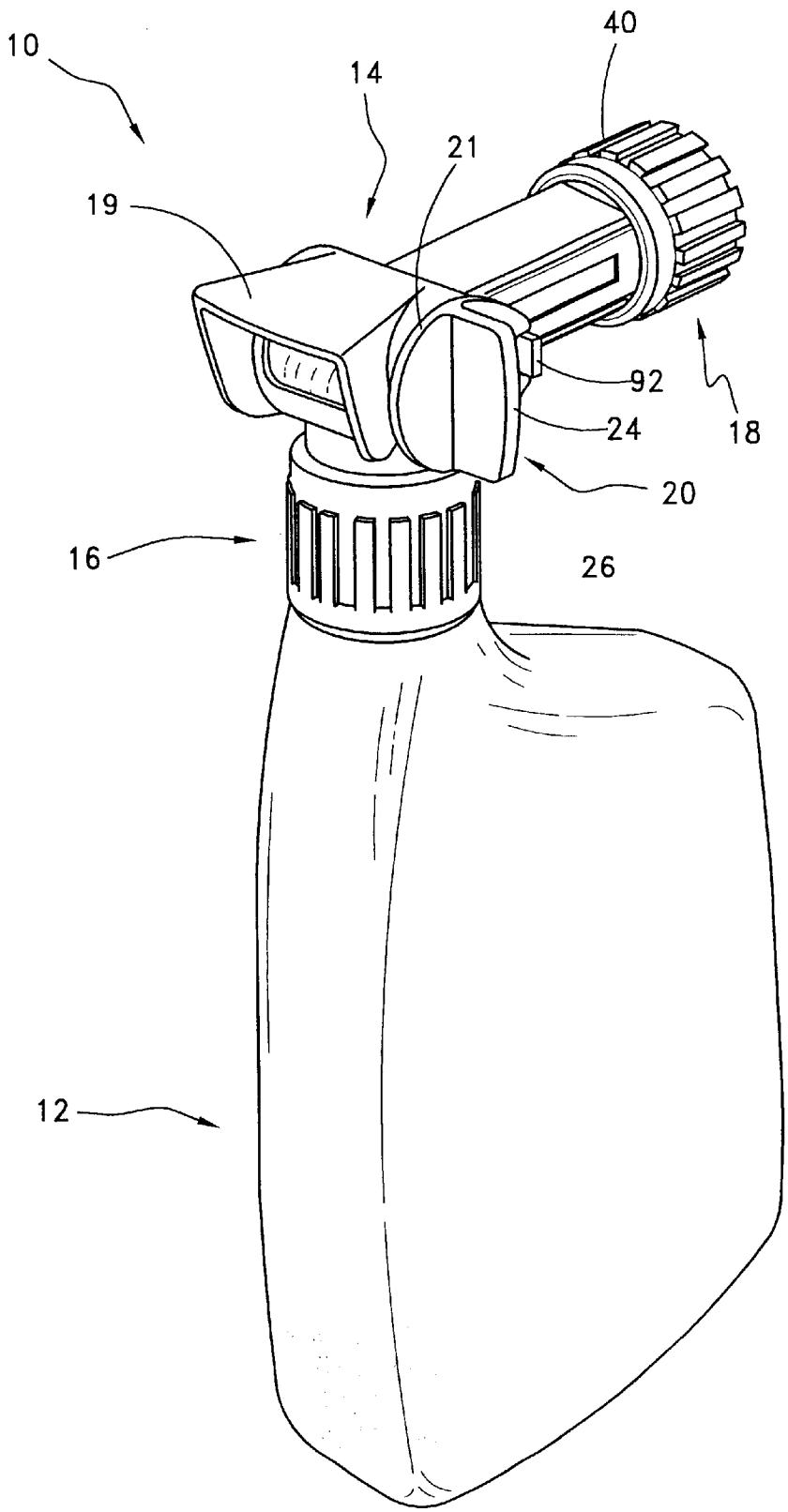
FIG. 1 is a perspective view sprayer head assembly that is attached to a chemical container; the sprayer head assembly having certain features and advantages that are in accordance with the principals of the present invention.

A sprayer head assembly 10 according a preferred embodiment of the present invention is illustrated in FIGS. 1–12B. As shown in FIG. 1, the sprayer head assembly 10 is connected to a chemical container 12. The sprayer head assembly 10 includes a sprayer head 14, a container connection portion 16, a supply fluid connection portion 18, and a rotatable control valve 20. The sprayer head assembly 10 may be made of any suitable material that is resistant to and compatible with the chemical fluid to be sprayed. However, a flexible plastic material, such as polypropylene, is preferred because it is resilient yet durable.

Figure 6:
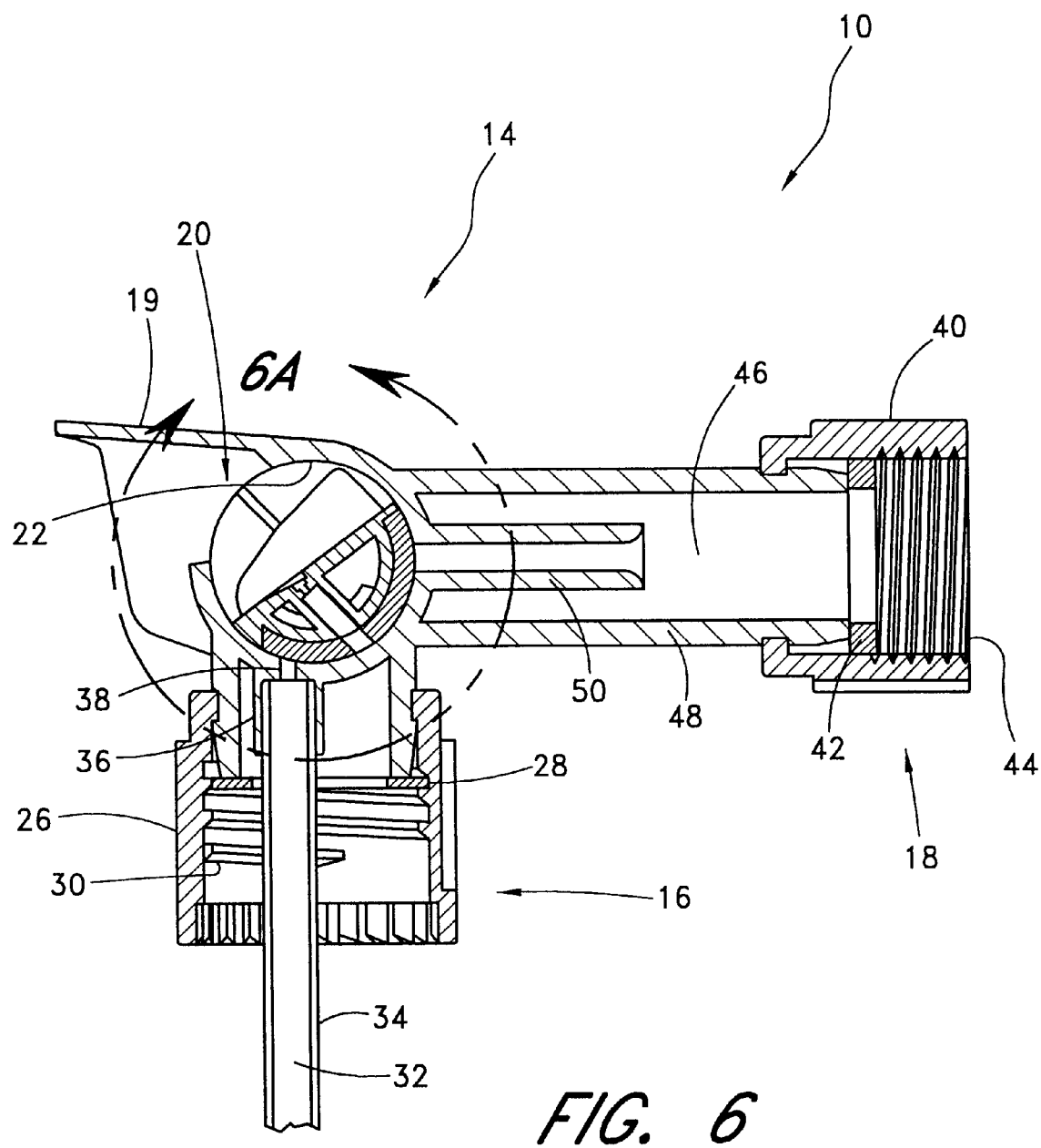
FIG. 6 is a cross-sectional view of the sprayer head assembly in the closed position taken along line 6—6 of FIG. 4.

With reference to FIGS. 1 and 6, the valve 20 is moveably positioned in a cylindrical bore 22 that is formed in the sprayer head 14 of the sprayer head assembly 10. The valve includes a gripping area or handle 24 that is mounted onto a valve cap 21. An operator opens and closes the valve 20 by twisting the handle 24. The valve 20, bore 22, and handle 24 are illustrated as being arranged substantially about a horizontal axis. This horizontal arrangement of the valve 20, bore 22, and handle 24 is preferred because it allows the operator to rotate the valve 20 in an ergonomical position. That is, the operator can hold the container 12 in one hand and rotate the valve 20 with the other hand without excessive rotation and lifting of the elbows and shoulders. In comparison, if the valve 20 is arranged in a vertical position, the operator typically has to lift and twist the operator's shoulders and elbows in order to rotate a valve 20. However, those of ordinary skill in the art will recognize that many of the aspects of the present invention may be achieved with the valve 20 arranged along a non-horizontal axis. The construction the valve 20 and bore 22 will be described in more detail below.

With continued reference FIGS. 1 and 6, the connection between the sprayer head assembly 10 and the container can be achieved by providing the container connection portion 16 with a conventional rotatable coupler 26 and a washer 28. The rotatable coupler 26 includes internal threads 30 that cooperate with corresponding threads (not shown) formed on the neck of the container 12.

The sprayer head assembly 10 can also be permanently attached to the container 12. In such an arrangement, adhesive can be applied to the inner surface of the connection portion 16 before it is fitted over the neck of the container 12. Alternatively, the connection portion 16 can include an inwardly projecting ratchet that opposes a cooperating ratchet formed on the container 12.

When the sprayer head assembly 10 is installed onto the container 12, the interior of the container 12 is in communication with a chemical passage 32 that is also in communication with the interior of the cylindrical bore 22. In the illustrated arrangement, the chemical passage 32 is defined in part by a downwardly depending chemical flow tube or dip tube 34. The dip tube 34 extends into the container 12 and preferably terminates near a bottom surface of the container. The chemical passage 32 is also defined in part by an internal passage 38, which is formed in the sprayer head 14. The internal passage 38 communicates with the interior of the cylindrical bore 22 and the dip tube 34. The dip tube 34 is secured in fluid communication with the internal passage 38 by a sleeve 36. Although, in the illustrated arrangement the chemical passage 32 is defined by two components (the dip tube 34 and the internal passage 38), it should be appreciated that the chemical passage 32 can be defined by a single component or more than two components. The illustrated arrangement, however, is preferred because it is easy to manufacture and yet uses a small number of components.

Figure 5:
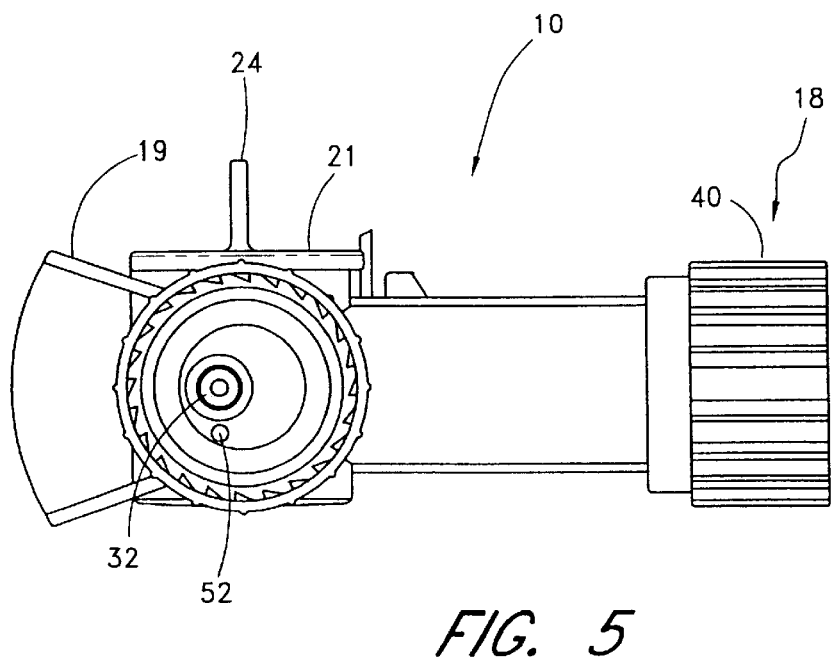
FIG. 5 is a bottom view of the sprayer head assembly of FIG. 1.

Preferably, the sprayer head assembly 10 includes a vent passage 52, which is shown in FIG. 5. In die illustrated arrangement, the vent passage 52 is defined by a small hole formed in the head 14 of the assembly. As with the chemical passage 32, the vent passage 52 communicates with the interior of the container 12 when the assembly 10 is mounted onto the container 12. The vent passage 52 extends up through head 14 and communicates with the interior of the cylindrical bore 22. The vent passage 52 lies generally parallel to (and spaced along the axis of the valve from) the interior passage 38. Although, in the illustrated arrangement the vent passage 52 is formed on the assembly 10, it should be appreciated that the vent passage 52 can be located on the container 12. However, the illustrated arrangement is preferred because, as will be explained below, it enables the vent passage 52 to be opened and closed with the chemical passage 32.

As mentioned above, the sprayer head assembly 10 also includes a supply fluid connection portion 18 (see FIG. 6). The supply fluid connection portion 18 connects the assembly to a pressurized supply fluid source (not shown), such as, for example, a garden hose. In the illustrated arrangement, the connection is formed by a conventional rotatable coupler 40 and a washer 42. The coupler 40 includes threads 44 that cooperate with corresponding threads (not shown) formed on the supply fluid source. One of ordinary skill in the art will appreciate that other means can be used to connect the assembly 10 to the supply fluid source.

With continued reference to FIG. 6, the sprayer head assembly 10 includes a supply passage 46. The supply passage 46 is in communication with the supply fluid source and the interior of the bore 22. In the illustrated arrangement, the supply passage 46 is defined in part by a side wall 48 of the sprayer head 14. The side wall 48 extends from the coupler 40 towards the cylindrical bore 22. The supply passage 46 is also defined in part by an elongated constriction passage 50, which in the preferred embodiment directly communicates with the cylindrical bore 22. The elongated constriction passage 50 helps to produce a uniform, non-turbulent stream of carrier fluid into the bore 22. In the illustrated arrangement, the side wall 48 and the elongated constriction passage 50 are integrated together. However, it should be appreciated that the these components can be made separately. It should also be appreciated that the supply passage 46 can be defined by a single component or more than two components, which can be integrated together or made separately. The illustrated arrangement is preferred because it is relatively simple to form and produces the desired uniform stream of carrier fluid.

As best seen in FIGS. 10A–D, the valve 20 is constructed with two outer walls 54 that define a cylindrical periphery for sliding engagement with the interior wall of the cylindrical bore 22 (FIG. 6). Preferably, the outer wall 54 nearest the handle 24 engages an annular groove 51 (shown in dashed lines in FIG. 4) that is formed along the interior wall of the cylindrical bore 22. Accordingly, the valve 20 is inserted into the sprayer head 14 by snap-fitting the valve 20 into the annular groove 51. Once snap-fitted, the valve 20 can rotate within the cylindrical bore 22 but is secured axially by the engagement of the outer wall 54 with the annular groove 51. The bore 22 is closed at one end by a bore cover 23 (see FIG. 8) that is preferably integrated with the assembly head 14. The bore 22 is closed at the other end by the valve cap 21.

In order to reduce the amount of material used in the valve 20, the valve 20 is preferably hollowed out. That is, several gaps 55 are formed in the body of the valve 20. These gaps 55 are positioned so as not compromise the structural integrity of the valve 20.

As will be explained below, the valve 20 controls the flow of chemical through the assembly 10. The valve 20 also preferably controls the flow of supply fluid through the assembly 10. More preferably, the valve 20 also controls the communication of the vent passage 52 with atmospheric pressure.

Figure 7:
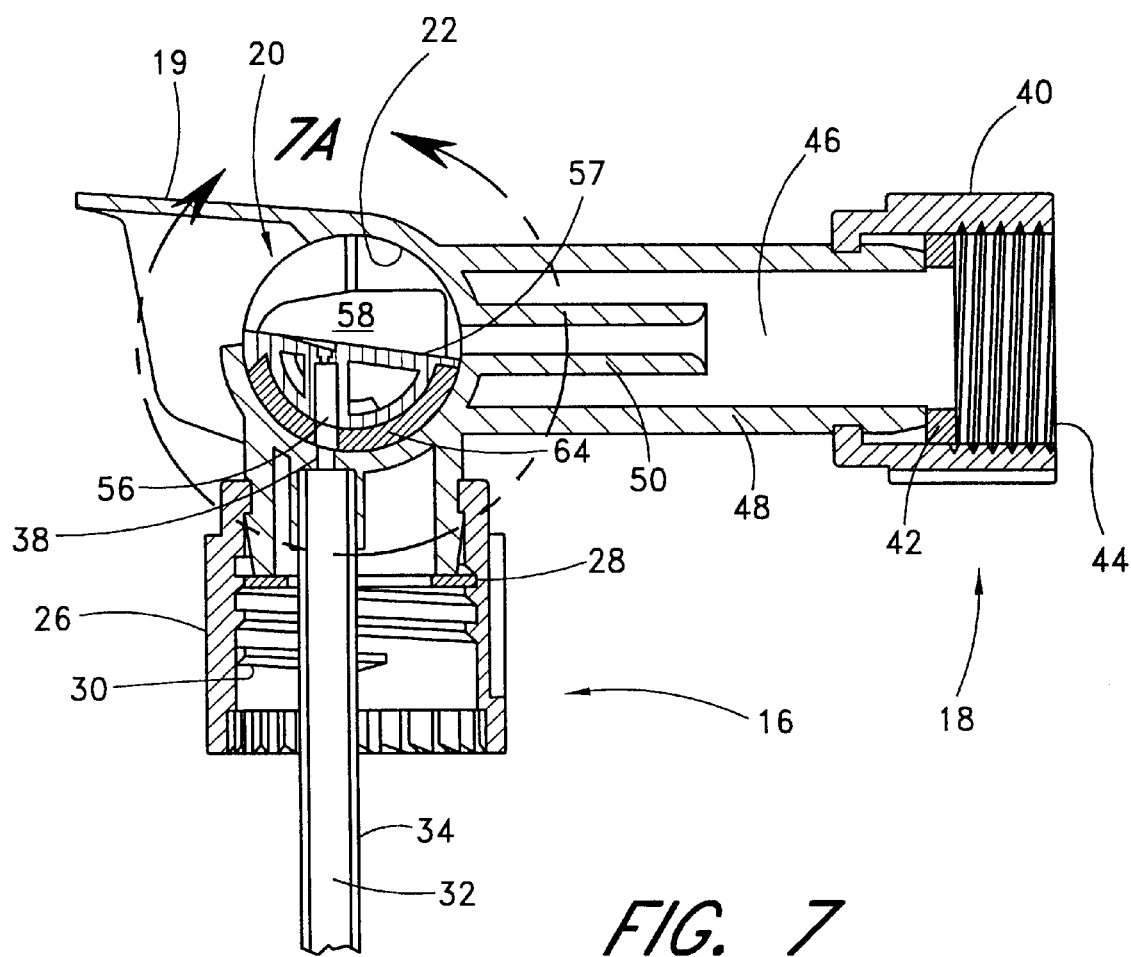
FIG. 7 is a cross-sectional view of the sprayer head assembly in the open position taken along line 7—7 of FIG. 4.

Accordingly, as best seen in FIG. 7, the valve 20 defines at least in part a first passage 56. The first passage 56 is configured and positioned within the valve 20 such that when the valve 20 is an open position (i.e., the position shown in FIG. 7) the first passage 56 is aligned with and communicates with the chemical passage 32. Preferably, the first passage 56 has a diameter that is slightly larger than the diameter of the internal passage 38. This arrangement helps to align the first passage 56 with the internal passage 38.

Figure 7A:
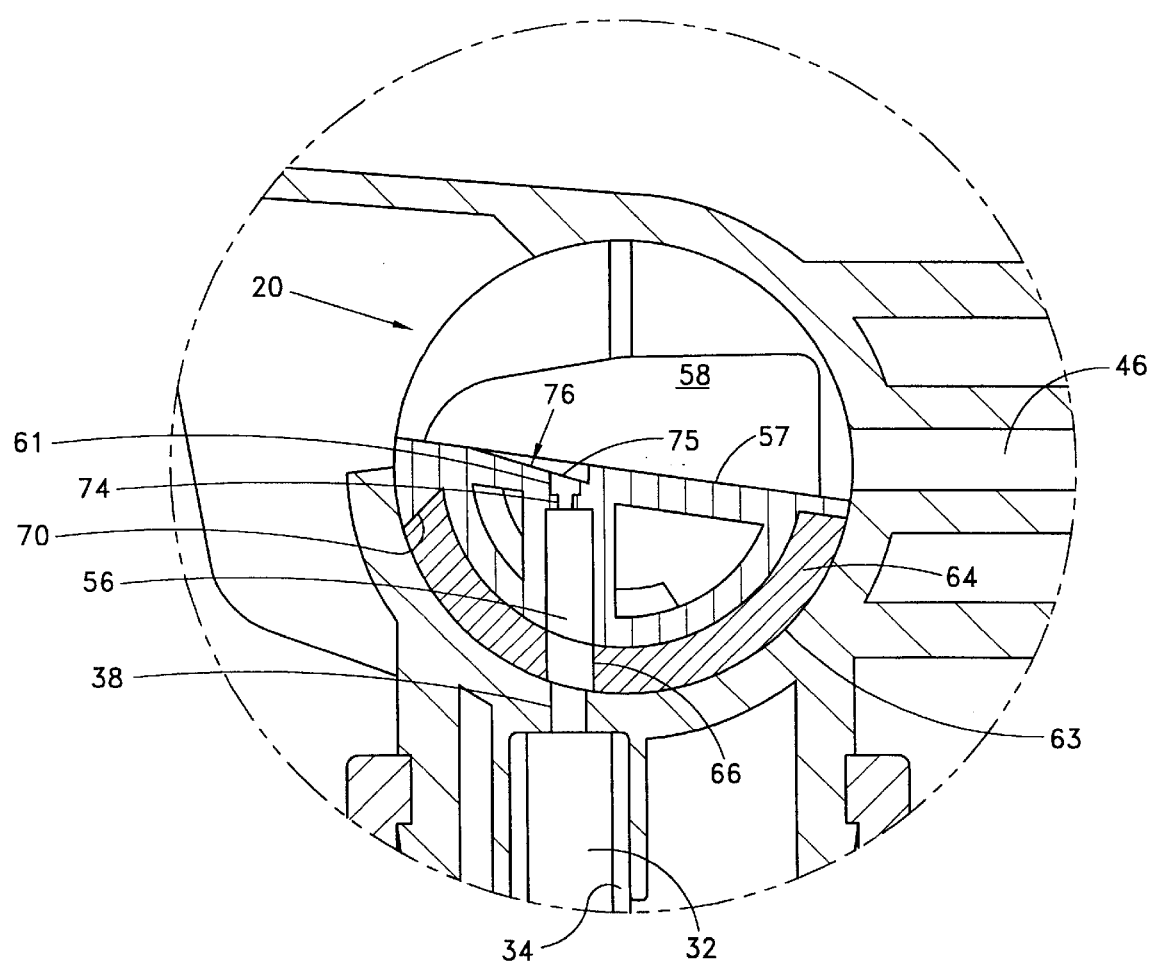
FIG. 7A is an enlarged view of a portion of the sprayer head assembly of FIG. 7.
Figure 8:
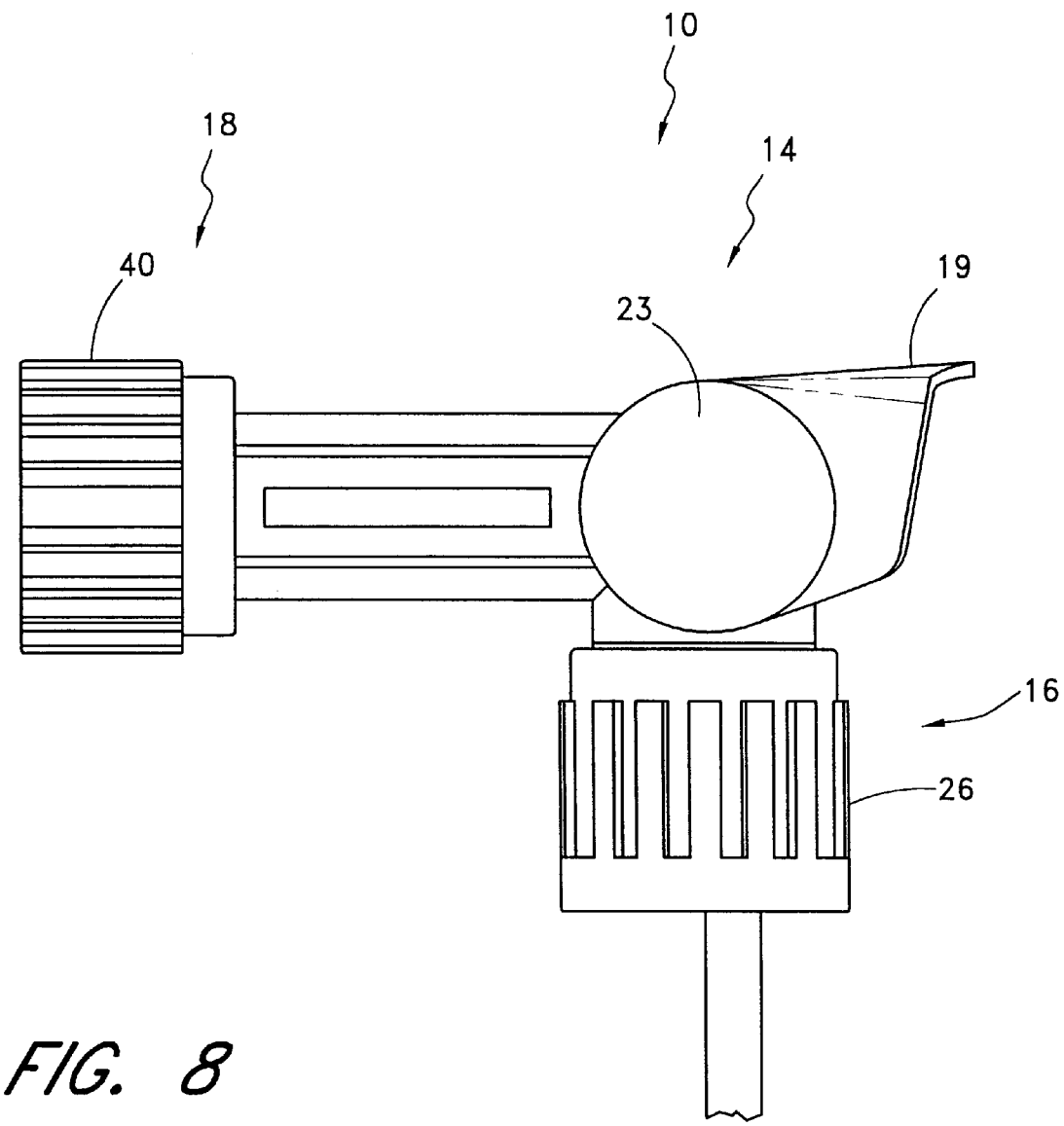
FIG. 8 is another side view of a different side of the sprayer head assembly of FIG. 2.
Figure 9:
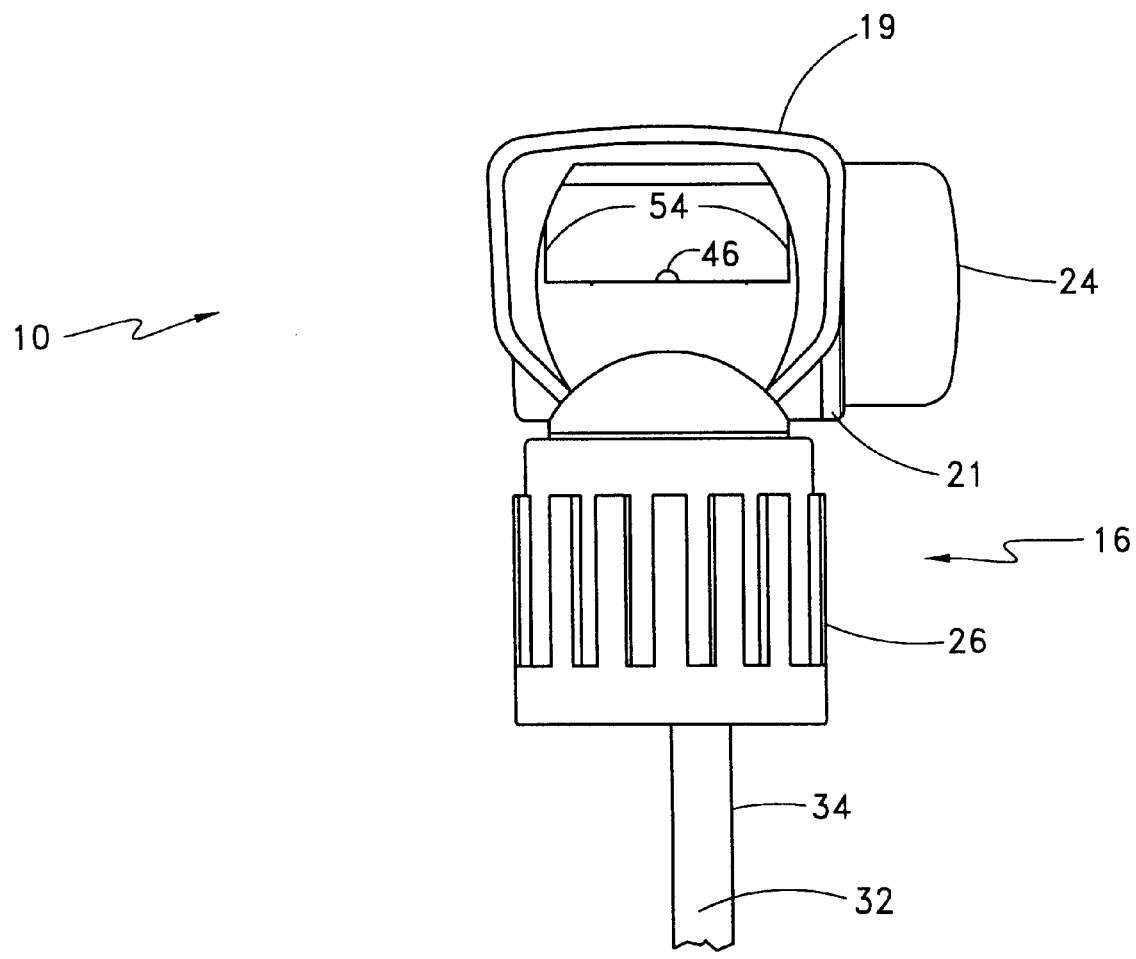
FIG. 9 is a front view of the sprayer head assembly of FIG. 1.

As best seen in FIG. 7A, the first passage 56 preferably communicates with a generally cylindrical metering orifice 74 that terminates at a generally cylindrical mouth 75. The mouth 75 is located within a graduated suction generating recess 76, which is formed on a suction generating surface 57. Preferably, the valve 20 defines the metering orifice 74, the mouth 75, the suction generating recess 76 and the suction generating surface 57. However, it should be appreciated that several advantages of the present invention can be achieved in an arrangement where the metering orifice 74, the mouth 75, the suction generating recess 76 and/or the suction generating surface 57 are not defined by the valve 20. The illustrated arrangement is preferred because, as will be explained in more detail below, the metering orifice 74 and the mouth 75 can be more accurately manufactured.

The diameter of the metering orifice 74 and mouth 75 determines, for the most part, the dilution ratio of the sprayer head assembly 10. The method for determining the diameter of the metering orifice and mouth 75 to achieve a desired dilution ratio are well known to those of ordinary skill in the art; therefore, a detailed description of such a method is not necessary.

Figure 10A:
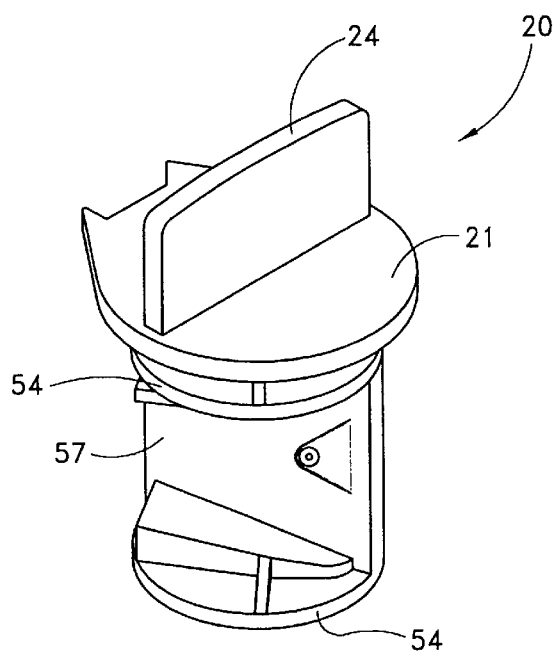
FIG. 10A is a perspective of the control valve having certain features and advantages according to the present invention.
Figure 10B:
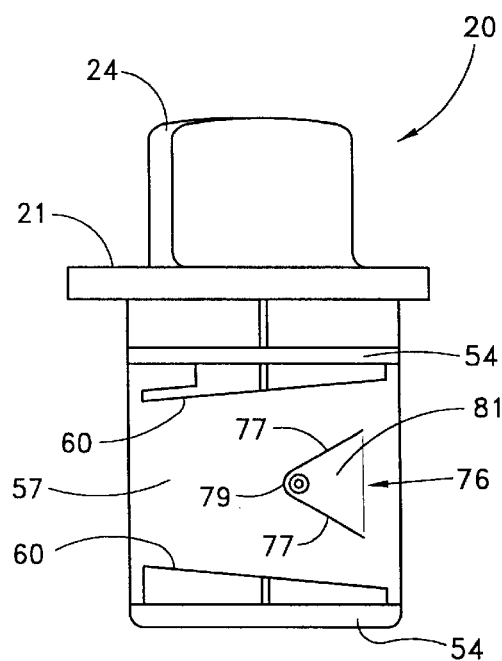
FIG. 10B is an side view of the control valve of FIG. 10A.
Figure 10C:
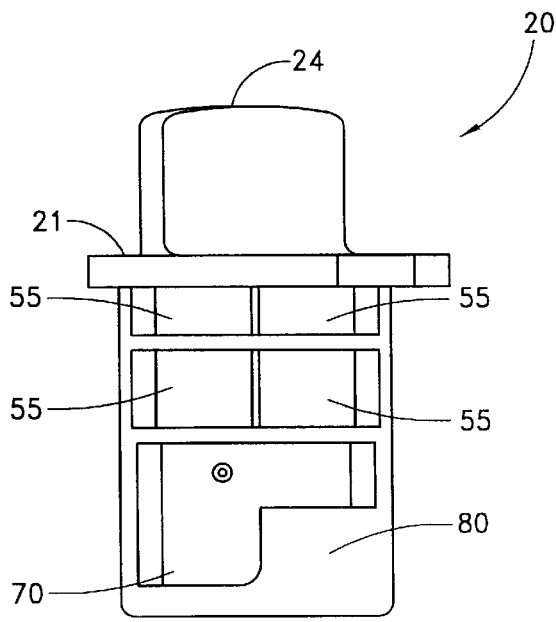
FIG. 10C is another side view from a different side of the control valve of FIG. 10A.
Figure 10D:
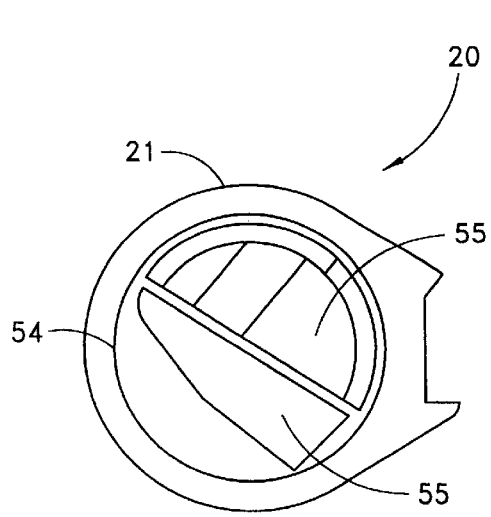
FIG. 10D is a bottom view of the control valve of FIG. 10A.

As best seen in FIG. 10B, the suction generating surface 57 defines the graduated suction generating recess 76. The recess 76 has a generally triangular shape that is formed by two side walls 77 and a rounded end wall 79. The mouth 75 of the metering orifice lies on a lower face 81 of the recess 76 near the rounded end wall 89. The recess 76 is deepest at the apex where the mouth 75 of the metering orifice 74 is located. The graduated suction generating recess 76 is sized and configured, as is well known in the art, so that when carrier fluid flows over the 76 recess a suction force is created. The suction force draws the chemical from the container 12 through the chemical passage 32. Of course, one of ordinary skill in the art will recognize that the desired suction force can be created with graduated suction generating recesses of other shapes and sizes.

As best seen in FIG. 7A, the valve 20 also defines, at least partially, a second passage 58 that is aligned with the supply passage 46 when the valve 20 is in the open position. The second passage 58 is preferably defined by the suction generating surface 57, the inner surface of the cylindrical bore 22, and a pair of side walls 60 (see FIG. 10B) that are defined by the valve 20. It should also be appreciated that the second passage 58 can be defined entirely by the valve 20. That is, interior surface of the cylindrical bore 22 can be replaced, wholly or in part, by an additional wall of the valve 20. However, the illustrated arrangement is preferred for several reasons. For example, this arrangement reduces the amount of material need to form the valve 20.

With continued reference to FIG. 7A, the valve 20 includes a sealing portion 63 that forms an annular seal with the bore 22 around the interface between the chemical passage 32 and the first passage 56. Accordingly, the connection between the chemical passage 32 and the first passage 56 is sealed and chemical is prevented from leaking into the gaps between the valve 20 and the cylindrical bore 22.

The sealing portion 63 is preferably formed from a separate single sealing member 64 (see also FIGS. 11 and 12) that is positioned within a recess 70 (see FIG. 10C) formed on the valve 20. The sealing member 64 is preferably made of a soft plastic elastomer material or other suitable synthetic rubber material. Such material provides an effective seal with the bore 22, which as mentioned above is preferably made of a harder plastic material. The sealing member 64 defines at least in part a transition passage 66, which defines part of the first passage 56. Accordingly, the transition passage 66 is in communication with the chemical passage 32 when the valve 20 is in the open position.

Because the sealing surface 63 is positioned on the valve 20, it is much easier to assemble the assembly 10 as compared a sprayer where the sealing surfaces are located on the head 14. Such a sprayer is particularly difficult to assemble such a sprayer because it is difficult to reach the interior surfaces of the head. This arrangement also eliminates the need for multiple O-rings on the valve.

Preferably, the sealing member 64 also preferably includes a channel or recess 67 (see FIG. 12B) that at least partially surrounds the opening of the transition passage 66. This recess 67 helps to align the transition 66 and chemical passages 32.

Figure 11A:
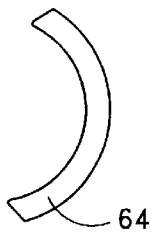
FIG. 11A is a side view of a sealing member having certain features and advantages according to the present invention.
Figure 11B:
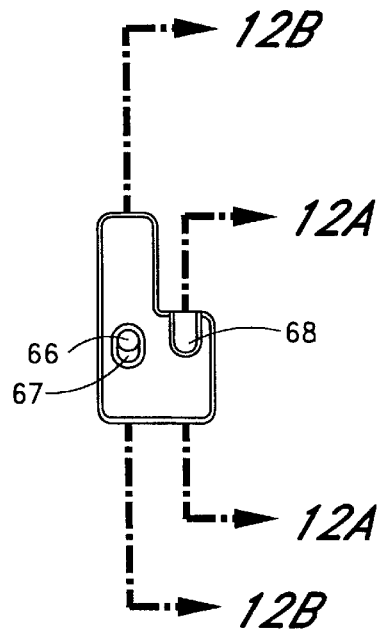
FIG. 11B is a front view of the sealing member of FIG. 11A
Figure 12A:
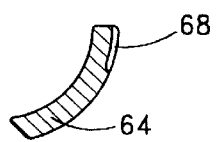
FIG. 12A is a cross-sectional view taken along line 12A—12A of FIG. 11B.
Figure 12B:
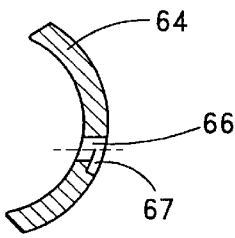
FIG. 12B is a cross-sectional view taken along line 12B—12B of FIG. 1B.
Figure 11C:
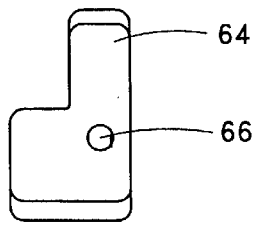
FIG. 11C is a rear view of the sealing member of FIG. 1A.

With reference to FIGS. 11B and 12A, the sealing member 64 also preferably includes a vent channel 68. When the valve is at the open position, the channel 68 is aligned with the vent passage 52. Accordingly, the channel 68 allows the vent passage 52 to be in communication with gaps that are formed between the valve 20 and the cylindrical bore 22. Accordingly, when the valve 20 is in the open position, the vent passage 52 is in communication with an atmospheric pressure source.

Figure 6A:
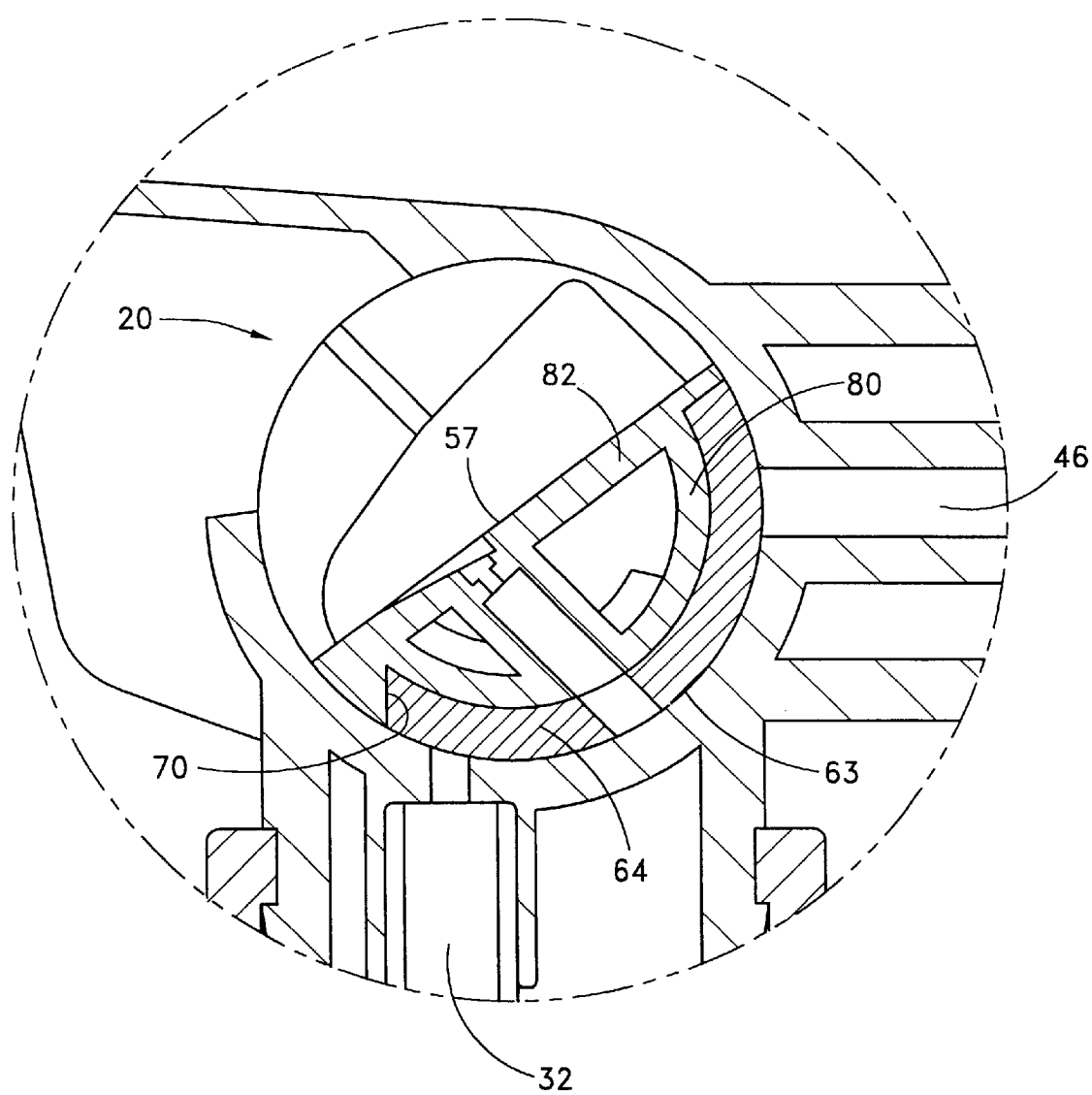
FIG. 6A is an enlarged view of a portion of the sprayer head assembly of FIG. 6.

As best seen in FIG. 6A, the sealing portion 63 is also preferably arranged on the valve so as to block both the carrier fluid passage 46 and the chemical fluid passage 32 when the valve 20 is in the closed position. The sealing portion 63 also preferably blocks the vent passage 52. Furthermore, as the valve 20 is rotated to the closed position (FIG. 6) from an open position (FIG. 7) the sealing portion 63 of the valve 20 is preferably positioned such that it remains in contact with the outlet of the chemical passage 32. In a similar manner, the sealing portion 63 also seals the vent passage 52 as the valve 20 is rotated to the closed position.

The illustrated sealing portion 63 of the valve 20 is formed from a single sealing member 64 that simultaneously blocks the carrier passage 46, the chemical passage 32, and the vent passage 52 when the valve is in the closed position. This arrangement is preferred because it reduces the number of parts required to construct the assembly 10. However, it should be appreciated that the sealing portion 63 could be formed from a plurality of sealing members 64 positioned within one or more recesses positioned on the valve 20. It should also be appreciated that, although the illustrated sealing portion 63 is preferably formed from a separate sealing member 64, the sealing portion 63 can be integrated into the valve 20 such that the valve 20 and sealing portion 63 comprise a single integrated part.

In operation when the valve 20 is in the open position (see FIG. 7A), a stream of pressurized carrier fluid is discharged into the second passage 58. As the carrier fluid flows over the suction generating surface 57, a suction force is created that draws chemical through the dip tube 34, transition passage 66, and first passage 56 and into the stream of carrier fluid. The upwardly inclined orientation of the suction generating surface 57 helps to generate the suction force. Venting is provided through the vent passage 52 (see FIG. 5) and the vent channel 68 (see FIG. 11B).

Preferably, the chemical and carrier fluid is directly discharged from the assembly 10 through the second passage 58. Accordingly, in order to produce an effective spray pattern, the channel walls 60 (see FIG. 10B) diverge slightly as they extend from the carrier passage 46. This configuration helps to spread the carrier fluid and chemical stream. The upwardly inclined orientation of the suction generating surface 57 of the valve 20 also helps to direct the chemical and carrier fluid stream away from the user.

As best seen in FIG. 7, the assembly 10 preferably includes a hood 19 that extends from the head 14 and the second passage 58. It should be appreciated that the hood 19 is not necessary to practice the present invention. However, the hood 19 is preferred because it protects the operator from water and chemical splatter. It should also be appreciated that an additional outlet nozzle could be added to the assembly 10 to further direct the water and chemical flow. Such a nozzle can extend from the second passage 58 and would offer additional control of the carrier fluid and chemical stream. In such an arrangement, one of ordinary skill in the art will recognize that the channel walls 60 do not have to be divergent. The illustrated arrangement is preferred, however, because it reduces the size of the assembly 10 and the number of components and yet still produces an effective spray pattern.

When the valve is rotated to the closed position (see FIG. 6A), the carrier passage 46, chemical passage 32 and the vent passage 52 are all closed by the valve 20. Specifically, the sealing portion 63 of the valve 20 forms a tight seal over these passages and prevents leakage. A particular advantage of the illustrated arrangement is the manner in which the sealing portion 63 is supported on the valve 20. As seen in FIG. 6A, the sealing portion 63 is formed by the sealing member 64, which is supported in the recess 70. The recess 70 is formed in a substantially cylindrical sealing wall 80 of the valve 20. In the closed position, the sealing wall 80 extends across the carrier fluid passage 46. Because the carrier fluid is pressurized, the carrier fluid exerts a relatively large force on the sealing member 64 and the sealing wall 80. This force pushes the sealing wall 80 away from the interior of the bore, which can cause the sealing wall 80 to flex. Flexing of the sealing wall 80 can compromise the seal between the sealing member 64 and the carrier fluid passage 46. Accordingly, the valve 20 preferably includes a bracing wall 82. As seen in FIG. 6A, the bracing wall 82 preferably extends across the carrier fluid passage. More preferably, the bracing wall 82 extends to the two ends of the sealing wall 80. The bracing wall 82 provides additional support to the sealing wall 80 in the direction of the force exerted by the carrier fluid. Flexing of the sealing wall 80 is therefore minimized and a the tight seal between the sealing member 64 and the carrier fluid passage 46 is maintained. Preferably, the bracing wall 82 also defines the suction generating surface 57. This arrangement is preferred because it further reduces the number of parts of the assembly 10.

Figure 2:
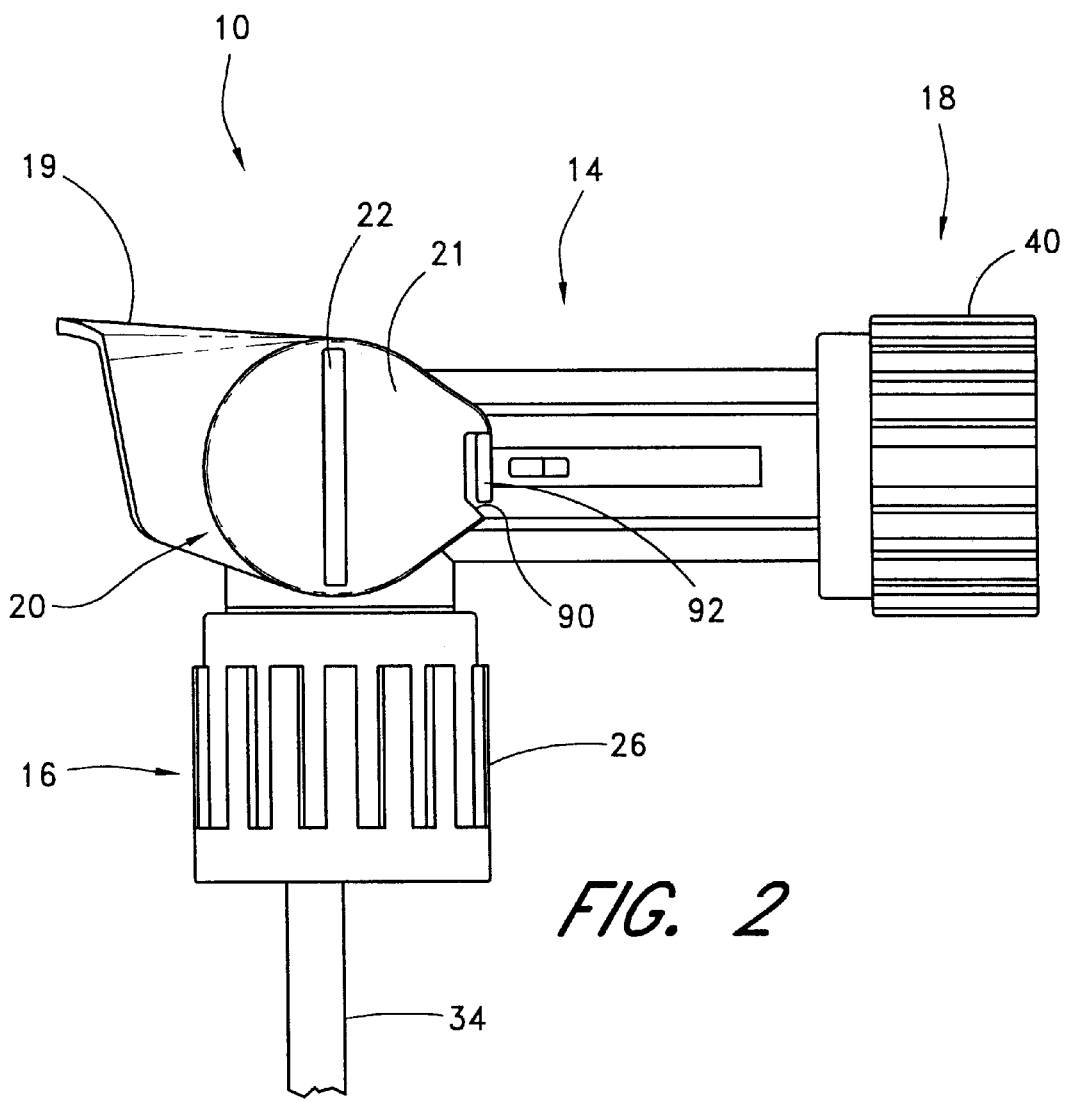
FIG. 2 is side view of the sprayer head assembly of FIG. 1 in a closed position.
Figure 3:
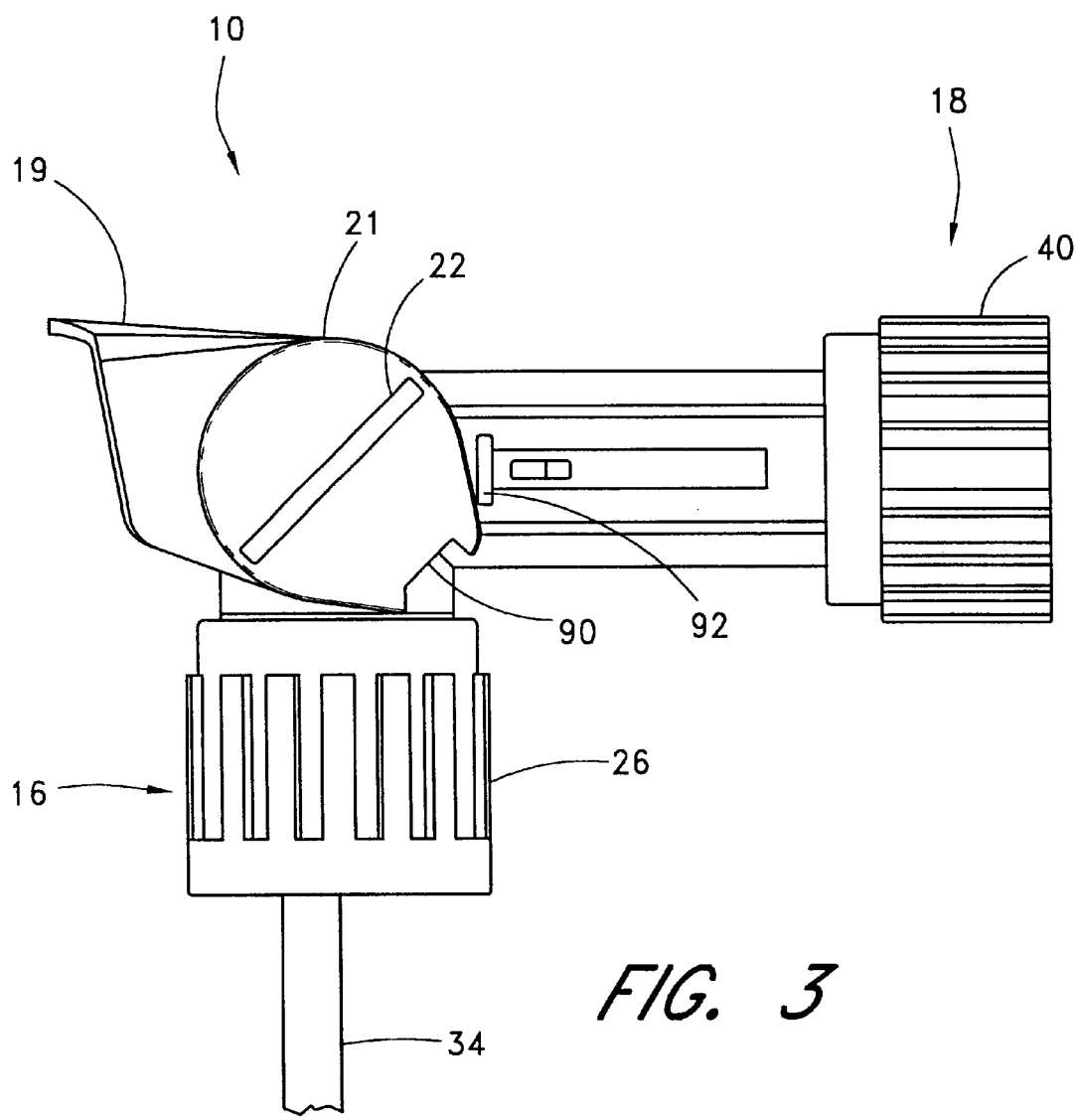
FIG. 3 is side view of the sprayer head assembly of FIG. 1 in an open position.
Figure 4:
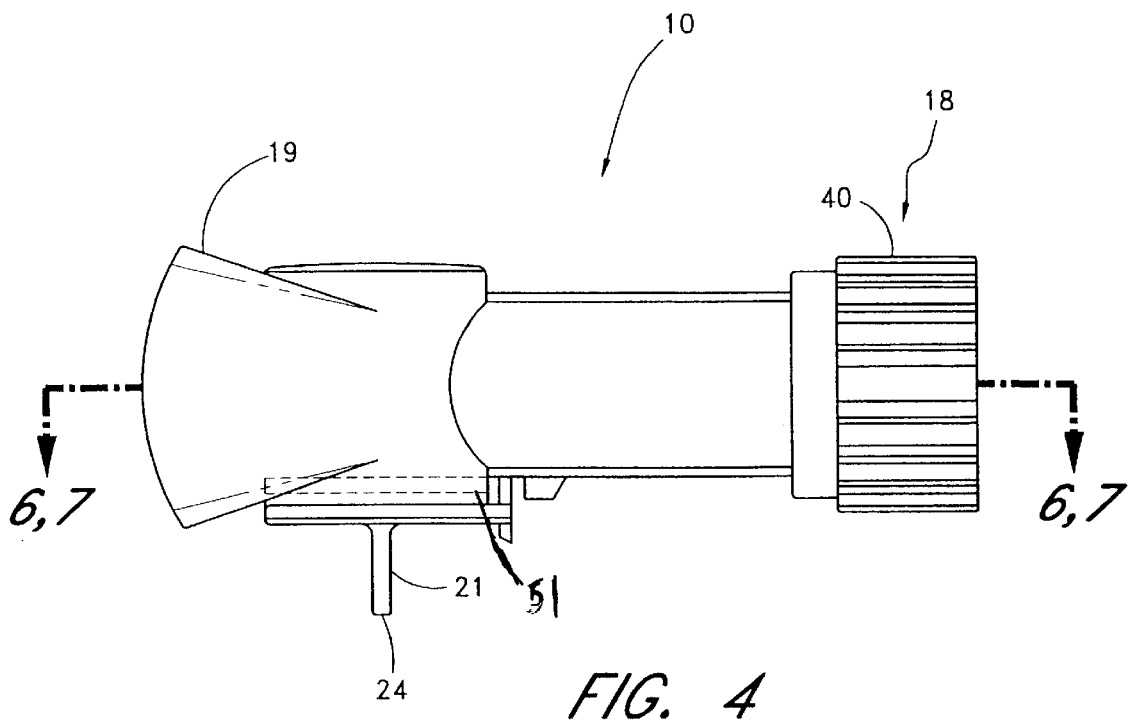
FIG. 4 is a top view of the sprayer head assembly of FIG. 1.

As mentioned above, the valve 20 can be conveniently operated with one hand while the assembly 10, container 12, and hose can be controlled with the other hand thereby providing a safe spray operation. The assembly 10 also preferably includes child-proofing features. As shown in FIGS. 2 and 3, a tab 92 extends from the connection portion 18 and engages an indentation 90 formed on the valve cap 21. When the valve 20 is in the closed position (FIG. 2), the tab 92 engages the indentation 90 and secures the valve in the closed position. Therefore, to open the valve 20, the operator must simultaneously pull back the tab 92 and rotate the valve 20. This requires a level of strength and dexterity that is typically not possessed by children.

The illustrated assembly 10 described above is particularly adapted to be manufactured by injection molding. Because the assembly 10 will typically be discarded after the chemical in the container 12 is exhausted, the costs of manufacturing the assembly 10 must be low. Injection molding is a particularly low cost method of making parts out of plastic-type materials. Those of ordinary skill in the art will recognize that the sprayer head 14, the container connection portion 16, the supply fluid connection portion 18, the sealing member 64 and the rotatable control valve 20 can all be formed using injection molding.

Another advantage of the present invention is that the valve 20 defines the metering orifice 74 and the mouth 75. As mentioned above, the diameters of the metering orifice 74 and the mouth 75 determine, for the most part, the dilution ratio of the sprayer assembly 10. Accordingly, to achieve a precise dilution ratio, tight tolerances are needed in the metering orifice 74 and the mouth 75. However, in prior art plastic sprayers, the sprayer head typically defines the metering orifice and mouth. Because the sprayer head is a relatively large part that is typically formed in a relatively large mold, thermal expansion in the mold makes it difficult to obtain tight tolerances in the metering orifice and mouth.

In comparison, the valve 20 is a much smaller small part. Accordingly, there is less thermal expansion in the mold for the valve 20 as compared to the mold for the sprayer head 14. Accordingly, it is easier to achieve tight tolerances in the valve 20 as compared to the sprayer head 14. Therefore, because the valve 20 of the present invention defines the metering orifice 74 and the mouth 75, it is easier to achieve tight tolerances in the orifice 74 and the mouth 75. Furthermore, because the orifice 74 and the mouth 75 are located in the valve 20, the dilution ratio of the sprayer head assembly 10 can be changed by simply changing the valve 20. This provides another important advantage.

To further reduce the cost of a aspirator-type sprayer, it is beneficial to use a minimum number of parts. The illustrated assembly 10 preferably includes only three main parts: the head 14, the control valve 20, and the sealing member 64. This represents a great improvement over sprayers that include a plurality of valves, multiple O-rings and multiple sealing members. Furthermore, the illustrated assembly 10 is easily assembled. The two main assembling steps are (i) attaching the sealing member 64 to the valve 20 and (ii) snap-fitting the valve 20 into the valve chamber 22.

Because of safety concerns, it is essential that an aspiration-type sprayer not leak. One of ordinary skill in the art will appreciate that the illustrated assembly 10 described above meets this requirement. In particular, the arrangement of the sealing member 64 on the valve 20 adequately prevents chemicals from leaking.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A chemical sprayer comprising a sprayer head assembly and a container that defines a cavity for storing a chemical to be sprayed; said sprayer head assembly comprising:

a chemical passage that is in communication with said cavity, a lower portion of said chemical passage being defined at least in part by an elongated tubular member that extends into said cavity;

a carrier fluid passage that is in communication with a carrier fluid source;

a valve chamber that is in communication with said chemical and carrier fluid passages, a valve moveably positioned within said valve chamber and rotatable about an axis, said valve at least partially defining a first passage and a second passage, said first passage is configured so as to be in communication with said lower portion of said chemical passage when said valve is in an open position, said second passage is configured so as to be in communication with said carrier fluid passage when said valve is in said open position, said first and second passages also configured so as to not be in communication with said lower portion of said chemical and carrier fluid passages when said valve is in a closed position;

said valve further comprising at least one sealing portion rotatable about said axis, said sealing portion positioned so as to block both the chemical and the carrier fluid passages when said valve is in said closed position such that said lower portion of said chemical passage is no longer in communication with said first passage; and wherein said assembly further includes a vent passage that is in communication with said cavity and spaced from said chemical passage, said valve being configured such that when said valve is in said closed position a surface of said at least one sealing portion blocks said vent passage to prevent said cavity from being in communication with an atmospheric pressure source through said vent passage.

2. A chemical sprayer as in claim 1, wherein said valve includes a sealing wall that extends across said carrier fluid passage, said at least one sealing portion is located at least in part on said sealing wall and said valve further includes a bracing wall that is coupled to said sealing wall at at least two points that are on opposite sides of said carrier fluid passage.

3. A chemical sprayer as in claim 1, wherein said at least one sealing portion does not form a single piece with said valve.

4. A chemical sprayer as in claim 1, wherein said valve includes at least one recess and said at least one sealing portion is positioned within said at least one recess.

5. A chemical sprayer as in claim 1, wherein when said valve is in said open position said vent passage is in communication with at least one gap formed between the valve and the valve chamber.

6. A chemical sprayer as in claim 1, wherein said at least one sealing portion is formed from a single sealing member.

7. A chemical sprayer comprising a sprayer head assembly and a container that defines a cavity for storing a chemical to be sprayed; said sprayer head assembly comprising:
   a chemical passage that is in communication with said cavity, a lower portion of said chemical passage being defined at least in part by an elongated tubular member that extends into said cavity;
   a carrier fluid passage that is in communication with a carrier fluid source;
   a valve chamber that is in communication with said chemical and carrier fluid passages, the valve chamber comprising a bore having a first open end and a second closed end;
   a valve moveably positioned within said valve chamber at least partially defining a first passage and a second passage, said first passage is configured so as to be in communication with said lower portion of said chemical passage when said valve is in an open position, said second passage is configured so as to be in communication with said carrier fluid passage when said valve is in said open position, said first and second passages also configured so as to not be in communication with said lower portion of said chemical and carrier fluid passages when said valve is in a closed position;
   said valve further comprising at least one sealing portion positioned so as to block both the chemical and the carrier fluid passages when said valve is in said closed position such that said lower portion of said chemical passage is no longer in communication wit said first passage; and
   wherein said assembly further includes a vent passage that is in communication with said cavity and said valve chamber, said valve being configured such that when said valve is in said closed position a surface of said at least one sealing portion prevents said cavity from being in communication with an atmospheric pressure source through said vent passage.

8. A chemical sprayer as in claim 7, wherein said valve includes a sealing wall that extends across said carrier fluid passage, said at least one sealing portion is located at least in part on said sealing wall and said valve further includes a bracing wall that is coupled to said sealing wall at at least two points that are on opposite side of said carrier fluid passage.

9. A chemical sprayer as in claim 7, wherein said at least one sealing portion does not form a single piece with said valve.

10. A chemical sprayer as in claim 7, wherein said valve includes at least one recess and said at least one sealing portion is positioned within said at least one recess.

11. A chemical sprayer as in claim 7, wherein when said valve is in said open position said vent passage is in communication with at least one gap formed between the valve and the valve chamber.

12. A chemical sprayer as in claim 7, wherein said at least one sealing portion is formed from a single sealing member.

13. A chemical sprayer comprising a sprayer head assembly and a container that defines a cavity for storing a chemical to be sprayed; said sprayer head assembly comprising:
   a chemical passage that is in communication wit said cavity, a lower portion of said chemical passage being defined at least in part by an elongated tubular member that extends into said cavity;
   a carrier fluid passage that is in communication with a carrier fluid source;
   a bore that is in communication with said chemical and carrier fluid passages;
   a valve moveably positioned at least partially within said bore, said valve at least partially defining a first passage and a second passage, said first passage is configured so as to be in communication with said lower portion of said chemical passage when said valve is in an open position, said second passage is configured so as to be in communication with said carrier fluid passage when said valve is in said open position, said first and second passages also configured so as to not be in communication with said lower portion of said chemical and cater fluid passages when said valve is in a closed position;
   said valve further comprising at least one sealing portion positioned so as to block both the chemical and the carrier fluid passages when said valve is in said closed position such that said lower portion of said chemical passage is no longer in communication with said first passage; and
   wherein said assembly further includes a vent passage that is in communication with said cavity and said bore, said valve being configured such that when said valve is in said closed position a surface of said at least one sealing portion prevents said cavity from being in communication with an atmospheric pressure source through said vent passage.

14. A chemical sprayer as in claim 13, wherein said valve includes a sealing wall that extends across said carrier fluid passage, said at least one sealing portion is located at least in part on said sealing wall and said valve further includes a bracing wall that is coupled to said sealing wall at at least two points that are on opposite sides of said carrier fluid passage.

15. A chemical sprayer as in claim 13, wherein said at least one sealing portion does not form a single piece with said valve.

16. A chemical sprayer as in claim 13, wherein said valve includes at least one recess and said at least one sealing portion is positioned within said at least one recess.

17. A chemical sprayer as in claim 13, wherein when said valve is in said open position said vent passage is in communication with at least one gap formed between the valve and the bore.

18. A chemical sprayer as in claim 13, wherein said at least one sealing portion is formed from a single sealing member.

* * * * *

UNITED STATES PATENT AND TRADEMARK OFFICE
CERTIFICATE OF CORRECTION

PATENT NO. : 6,672,520 B2  
DATED : January 6, 2004  
INVENTOR(S) : Donald Shanklin et al.

It is certified that error appears in the above-identified patent and that said Letters Patent is hereby corrected as shown below:

<u>Column 11,</u>  
Line 33, delete "wit" and insert -- with --.  
Line 47, delete "side" and insert -- sides --.

<u>Column 12,</u>  
Line 5, delete "wit" and insert -- with --.  
Line 24, delete "cater" and insert -- carrier --.

Signed and Sealed this

Sixth Day of June, 2006

JON W. DUDAS  
*Director of the United States Patent and Trademark Office*